United States Patent [19]
Gullo et al.

[11] Patent Number: 5,658,476
[45] Date of Patent: Aug. 19, 1997

[54] LASER ENCLOSURE

[75] Inventors: Christopher Thomas Gullo, Centerville; Stephen James Bolin, Troy, both of Ohio

[73] Assignee: Motoman Inc., West Carrollton, Ohio

[21] Appl. No.: 535,371

[22] Filed: Sep. 28, 1995

[51] Int. Cl.⁶ .................................................. B23K 26/12
[52] U.S. Cl. .............................. 219/121.86; 219/121.82
[58] Field of Search ..................... 219/121.86, 121.82, 219/121.22, 121.43

[56] References Cited

U.S. PATENT DOCUMENTS

| | | |
|---|---|---|
| 3,775,586 | 11/1973 | Flint et al. . |
| 4,205,216 | 5/1980 | Douglas ............................... 219/121.6 |
| 4,617,446 | 10/1986 | Anderson . |
| 4,659,902 | 4/1987 | Swensrud et al. . |
| 4,884,189 | 11/1989 | Kimura et al. . |
| 5,181,898 | 1/1993 | Piotrowski . |
| 5,183,993 | 2/1993 | Sato et al. . |
| 5,265,497 | 11/1993 | Curless . |
| 5,274,212 | 12/1993 | Campbell et al. ................... 219/121.86 |
| 5,464,963 | 11/1995 | Hostler et al. ...................... 219/121.82 |

FOREIGN PATENT DOCUMENTS

| | | |
|---|---|---|
| 2614477 | 10/1988 | France . |
| 63-9170 | 1/1988 | Japan . |

OTHER PUBLICATIONS

Vasilash, G., "An Exclusive Lock: Motoman's LaserWorld: Will This Standard Laser Robot Package Revolutionize Manufacturing?", Reprinted from *Production Magazine*, pp 1–4, 1992.

*Primary Examiner*—Geoffrey S. Evans
*Attorney, Agent, or Firm*—Killworth Gottman Hagan & Schaeff LLP

[57] ABSTRACT

A laser enclosure is provided including a housing having an inner cavity in which laser operations are capable of being performed and a section having an opening through which workpieces pass into and out of the inner cavity. The enclosure further includes a workpiece positioner rotatable about a generally horizontal axis for moving workpieces from a workpiece loading and unloading zone, through the opening to a work zone within the inner cavity. The workpiece positioner includes a first workpiece holder adapted to releasably receive at least one of the workpieces. The enclosure also includes passive sealing apparatus movably coupled to one of the section and the workpiece positioner via a slide attachment device for sealing at least one portion of the section to at least one portion of the workpiece positioner to inhibit laser energy from exiting the housing through the opening.

26 Claims, 12 Drawing Sheets

LASER ENCLOSURE

BACKGROUND OF THE INVENTION

The present invention relates in general to laser enclosures and, more particularly, to such an enclosure having at least one workpiece positioner for moving workpieces from a workpiece loading/unloading zone, through an opening in the enclosure housing to a work zone within the housing and passive sealing apparatus for sealing a portion of the housing to a portion of the workpiece positioner to inhibit laser energy from exiting the housing through the opening.

Industrial lasers are known in the prior art. Such lasers are commonly used for purposes of welding and cutting. U.S. and international standards have been developed which divide all industrial lasers into four major hazard categories, i.e., four broad classes (I to IV). The weakest lasers are Class I lasers which emit laser radiation below known hazard levels. The strongest lasers are Class IV lasers which are hazardous to view under any condition (directly or diffusely scattered) and are a potential fire hazard and a skin hazard.

Laser enclosures are also known in the prior art. Such enclosures are commonly used as protective enclosures for higher powered lasers, e.g., Class II, Class III or Class IV lasers, and allow the higher powered lasers to operate in a lower classification. For example, some Class I industrial lasers consist of a higher class laser enclosed in a properly interlocked and labeled protective enclosure.

U.S. Pat. No. 4,205,216 to Douglas discloses a laser enclosure comprising a plurality of stationary walls, a stationary ceiling and a front stationary wall having an opening through which workpieces pass into and out of the inner cavity of the enclosure. The enclosure further includes a rotary turntable having a plurality of vertical baffles which extend from a hub at the turntable's center of rotation. Positioned between the vertical baffles are fixtures for mounting workpieces onto the rotary turntable. The rotary turntable is not designed for use with long, narrow workpieces, such as automotive frame rails, mufflers or the like. Nor do the fixtures allow for movement of the workpieces during welding.

Accordingly, there is a need for a laser enclosure which is adapted for use with workpieces having a somewhat high aspect ratio, i.e., the ratio of their length to width is particularly large, and allows for movement of the workpieces during welding.

SUMMARY OF THE INVENTION

The protective enclosure of the present invention is believed to meet these needs. The enclosure of the present invention may be used, for example, to encase a Class IV laser to allow it to operate as a Class I laser. The protective enclosure includes a housing having a section with an opening through which workpieces pass into and out of an inner cavity of the housing. Additionally provided is a workpiece positioner for moving workpieces from a workpiece loading/unloading zone, through the opening in the housing to a first work zone within the housing inner cavity. The workpiece positioner is provided with at least one workpiece holder which is capable of supporting workpieces having a generally high aspect ratio. The workpiece holder further includes a device for effecting movement of the workpieces during welding.

In accordance with a first aspect of the present invention, a laser enclosure is provided comprising a housing having an inner cavity in which laser operations are capable of being performed and a section having an opening through which workpieces pass into and out of the inner cavity. The enclosure further includes a workpiece positioner rotatable about a generally horizontal axis for moving workpieces from a workpiece loading/unloading zone, through the opening to a work zone within the inner cavity. The workpiece positioner includes a first workpiece holder adapted to releasably receive at least one of the workpieces. The enclosure also includes passive sealing apparatus movably coupled to one of the section and the workpiece positioner for sealing at least one portion of the section to at least one portion of the workpiece positioner to inhibit laser energy from exiting the housing through the opening.

The first section comprises a first generally vertical wall having the first opening therein. The housing further comprises second, third and fourth generally vertical walls, and a ceiling connected to the first, second, third and fourth walls.

The workpiece positioner further comprises a frame and first and second shielding panels which are fixedly connected to the frame. The frame comprises a first frame section rotatable about the horizontal axis and second, third, fourth and fifth frame sections. The second and third frame sections are spaced from one another and fixedly connected to the first frame section. Likewise, the fourth and fifth frame sections are spaced from one another and fixedly connected to the first frame section.

The first workpiece holder comprises a first headstock which is fixedly connected to the second frame section and a first tailstock which is fixedly connected to the third frame section. The workpiece positioner further includes a second workpiece holder comprising a second headstock fixedly connected to the fourth frame section and a second tailstock fixedly connected to the fifth frame section.

The workpiece positioner further includes a drive device associated with the frame for effecting rotation of the frame through an angle of approximately 180° such that the first workpiece holder moves through an angle of approximately 180° as it moves back and forth between its loading/unloading and welding positions.

The passive sealing apparatus comprises first and second sealing members and attachment devices for movably coupling the first and second sealing members to the section.

The workpiece positioner rotates between first and second locked positions and engages with the first and second sealing members as it rotates to either of its first and second locked positions to move the first and second sealing members to a sealed position. A first portion of the workpiece positioner engages with the first sealing member and a second portion of the workpiece positioner engages with the second sealing member when the workpiece positioner is positioned in its first locked position and the first portion of the workpiece positioner engages with the second sealing member and the second portion of the workpiece positioner engages with the first sealing member when the workpiece positioner is positioned in its second locked position.

At least one of the attachment devices comprises a bearing block which is pivotably connected to one of the first and second sealing members. The bearing block is movable back and forth along an associated rail which in turn is fixedly connected to the first section.

The at least one portion of the workpiece positioner has a generally I-shaped cross section.

The first workpiece holder includes a device for effecting rotation of the workpiece during welding so that, for example, a weld may be made about a circumferential portion of the workpiece.

In accordance with a second aspect of the present invention, a protective partition is provided. The partition comprises a section having an opening through which workpieces pass into and out of a work zone. The partition further includes a workpiece positioner for moving the workpieces from a workpiece loading/unloading zone, through the opening to the work zone. The workpiece positioner includes a workpiece holder adapted to releasably receive at least one of the workpieces. The partition further includes passive sealing apparatus comprising at least one sealing member which is movably coupled to one of the section and the workpiece positioner via at least one slide attachment device for sealing at least one portion of the section to at least one portion of the workpiece positioner to inhibit laser energy from exiting through the partition opening.

The first section of the partition comprises a first generally vertical wall having the first opening therein.

In accordance with a third aspect of the present invention, an enclosure is provided comprising a housing having an inner cavity in which laser operations are capable of being performed and a section having an opening through which workpieces pass into and out of the inner cavity. The enclosure further includes a workpiece positioner for moving the workpieces from a workpiece loading/unloading zone, through the opening to a work zone within the inner cavity. The workpiece positioner includes a workpiece holder adapted to releasably receive at least one workpiece. The enclosure also includes passive sealing apparatus comprising at least one sealing member which is movably coupled to one of the section and the workpiece positioner via at least one slide attachment device for sealing at least one portion of the section to at least one portion of the workpiece positioner to inhibit laser energy from exiting the housing through the opening.

Accordingly, it is an object of the present invention to provide an improved protective enclosure for encasing a workstation. It is a further object of the present invention to provide an improved laser sealing enclosure for encasing a laser workstation. It is another object of the present invention to provide an improved passive sealing arrangement for a laser enclosure. It is yet a further object of the present invention to provide an improved laser enclosure having a workpiece positioner for moving workpieces having a high aspect ratio from a workpiece loading/unloading zone, through an opening in the enclosure housing to a work zone within the housing inner cavity. It is yet another object of the present invention to provide an improved laser enclosure having a workpiece positioner provided with a workpiece holder including a device for effecting movement of the workpiece during welding. It is still a further object of the present invention to provide a protective partition. These and other objects and advantages of the present invention will be apparent from the following description, the accompanying drawings and the appended claims.

DETAILED DESCRIPTION OF THE INVENTION

Figure 1:
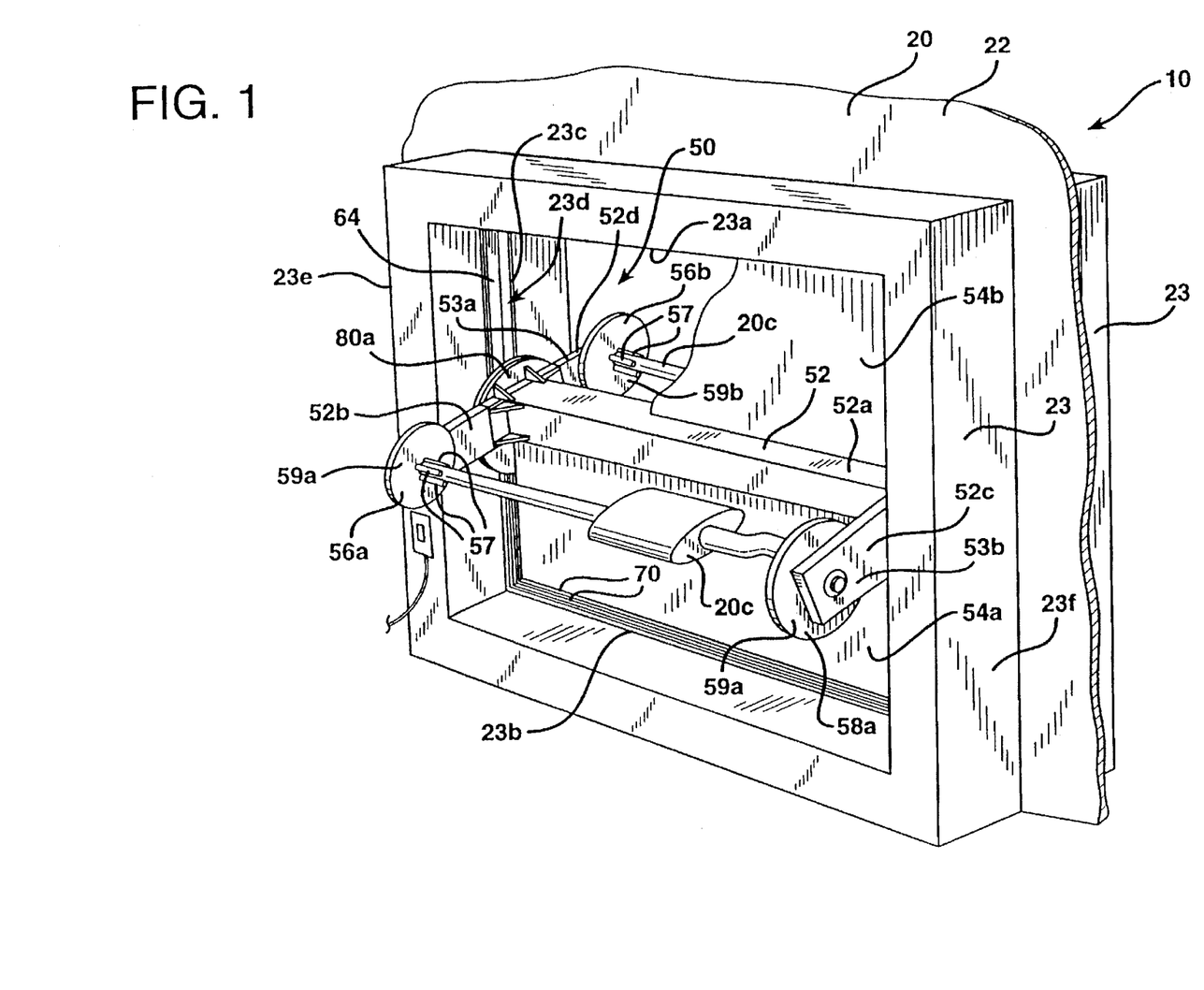
FIG. 1 is a perspective view of a portion of a laser enclosure constructed in accordance with the present invention.
Figure 1A:
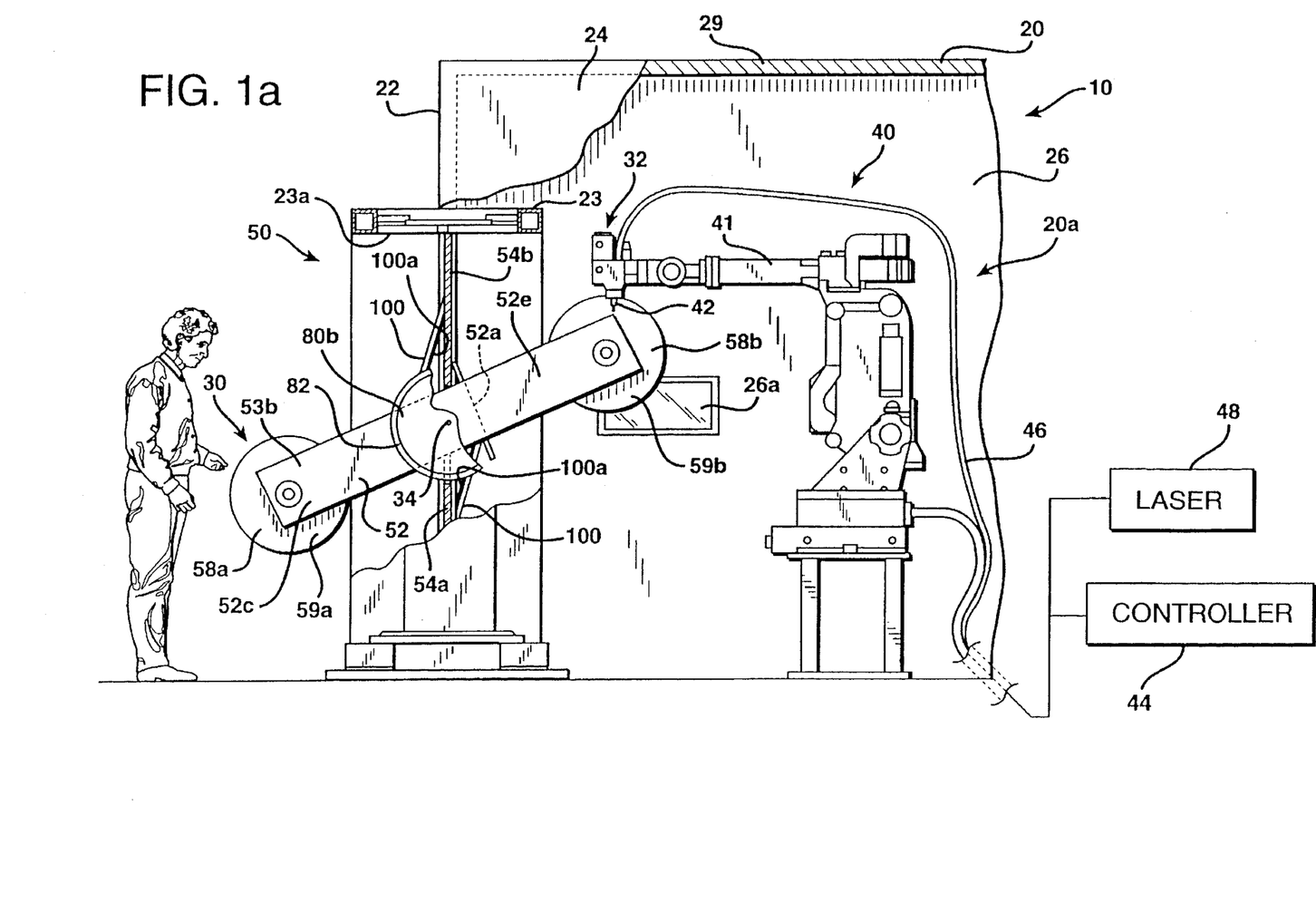
FIG. 1A is a side view, partially broken away, of a portion of the laser enclosure shown in FIG. 1.

Reference is now made to FIGS. 1 and 1A, which illustrate a protective laser enclosure 10 constructed in accordance with the present invention. The enclosure system 10 includes a housing 20 having a first wall 22, a second wall 24, a third wall 26 and a fourth wall (not shown). A stationary ceiling 29 is fixedly connected to the first, second, third and fourth walls. The third wall 26, in the illustrated embodiment, includes at least one filtered viewing port 26a.

The housing 20 includes an inner cavity 20a containing a device 40 for cutting or welding workpieces 20c, such as automotive frame rails, mufflers and the like. The device 40 comprises, in the illustrated embodiment, an articulated arm robot 41 (see, e.g., U.S. Pat. No. 4,884,189, the disclosure of which is hereby incorporated by reference) having a Nd:YAG continuous wave (CW) cutting or welding head 42. The robot 41 is controlled via a system controller 44. Such a robot 41 is commercially available from Motoman Inc. and is sold under any one of the following trademarks: Motoman* $^K$10S, K10ASB, or K60A Robot. The controller 44 is likewise commercially available from Motoman Inc. A fiber optic cable 46 connects the head 42 with a conventional Nd:YAG laser 48. The device 40 may alternatively comprise any machine used in cutting or welding, such as a $CO_2$ laser device or an electric-arc welding device.

The first wall 22 (also referred to herein as the first section) includes a circumferential casing 23 which defines a first opening 23a in the first wall 22 through which the workpieces 20c pass into and out of the inner cavity 20a, see FIGS. 1 and 1A. A workpiece positioner 50 is associated with the casing 23 and serves to move one or more workpieces 20c from a workpiece loading/unloading zone 30, through the opening 23a to a work zone 32 within the inner cavity 20a.

Figure 2:
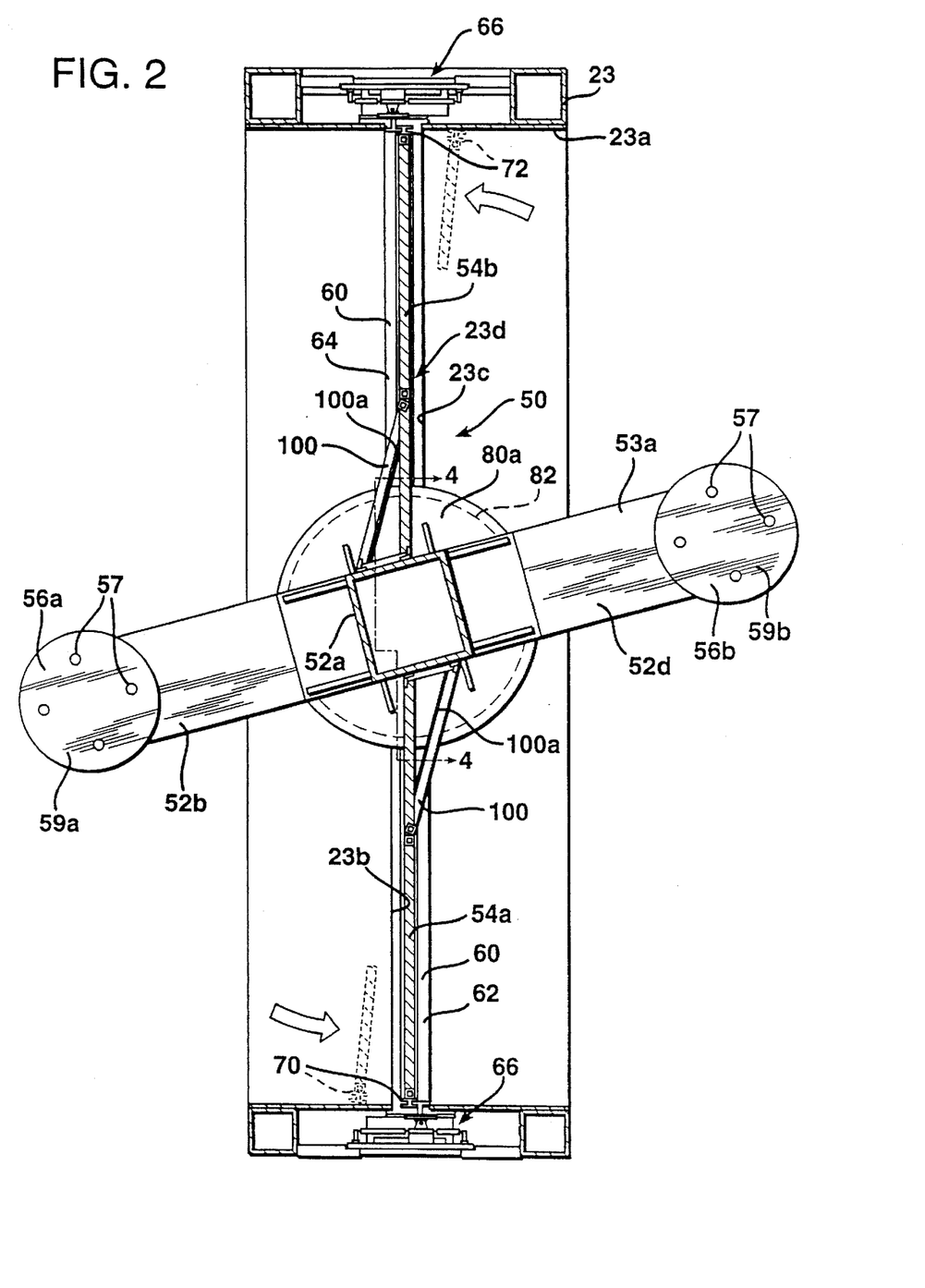
FIG. 2 is a side view, partially in cross section, of a workpiece positioner and sealing apparatus of the enclosure of the present invention and showing the workpiece positioner in its first locked position.

The workpiece positioner 50 comprises a frame 52 and first and second shielding panels 54a and 54b which are fixedly connected to the frame 52, see FIGS. 1, 1A and 2. The frame 52 comprises a first frame section 52a rotatable about a horizontal axis 34, see FIG. 1A. The frame 52 further comprises first and second frame arms 53a and 53b which are fixedly connected to opposing ends of the first frame section 52a so as to rotate therewith. The first frame arm 53a defines second and fourth frame sections 52b and 52d and the second frame arm 53b defines third and fifth frame sections 52c and 52e.

A first headstock 56a is rotatably connected to the second frame section 52b and a first tailstock 58a is rotatably connected to the third frame section 52c and together they define a first workpiece holder 59a, see FIG. 1. A second headstock 56b is rotatably connected to the fourth frame section 52d and a second tailstock 58b is rotatably connected to the fifth frame section 52e and together they define a second workpiece holder 59b, see also FIG. 1A. Each of the first and second headstocks 56a and 56b is independently rotatably driven by a conventional servo-drive device (not shown) or other similar rotary drive apparatus so as to effect rotation of a workpiece 20c positioned between it and its associated tailstock during a welding or cutting operation. As can be discerned from FIG. 1, the first and second workpiece holders 59a and 59b are designed to accommodate workpieces 20c having a somewhat high aspect ratio, i.e., the ratio of their length to width is particularly large. Examples of such workpieces 20c include automotive frame rails, mufflers and the like. Conventional bolts 57 are provided for releasably securing the workpieces 20c to the headstocks 56a and 56b and tailstocks 58a and 58b, see FIGS. 1 and 2.

A drive device (not shown) associated with the first frame section 52a is further provided for effecting rotation of the first frame section 52a and, hence, the first and second shielding panels 54a and 54b and the first and second workpiece holders 59a and 59b back and forth through an angle of approximately 180°. Thus, when the workpiece positioner 50 is caused to rotate clockwise by the drive device from its first locked position shown in FIGS. 1 and 2 to its second locked position shown in FIG. 3, a workpiece 20c mounted to the first workpiece holder 59a moves from the workpiece loading/unloading zone 30, through the opening 23a to the work zone 32 within the inner cavity 20a. Simultaneously, a workpiece 20c mounted to the second workpiece holder 59b is caused to move from within the inner cavity 20a, through the opening 23a to the workpiece loading/unloading zone 30. When the workpiece positioner 50 is caused to rotate counterclockwise by the drive device from its second locked position shown in FIG. 3 to its first locked position shown in FIGS. 1 and 2, a workpiece 20c mounted to the second workpiece holder 59b moves from the workpiece loading/unloading zone 30, through the opening 23a to the work zone 32 within the inner cavity 20a. Simultaneously, a workpiece 20c mounted to the first workpiece holder 59a is caused to move from within the inner cavity 20a, through the opening 23a to the workpiece loading/unloading zone 30.

Figure 3:
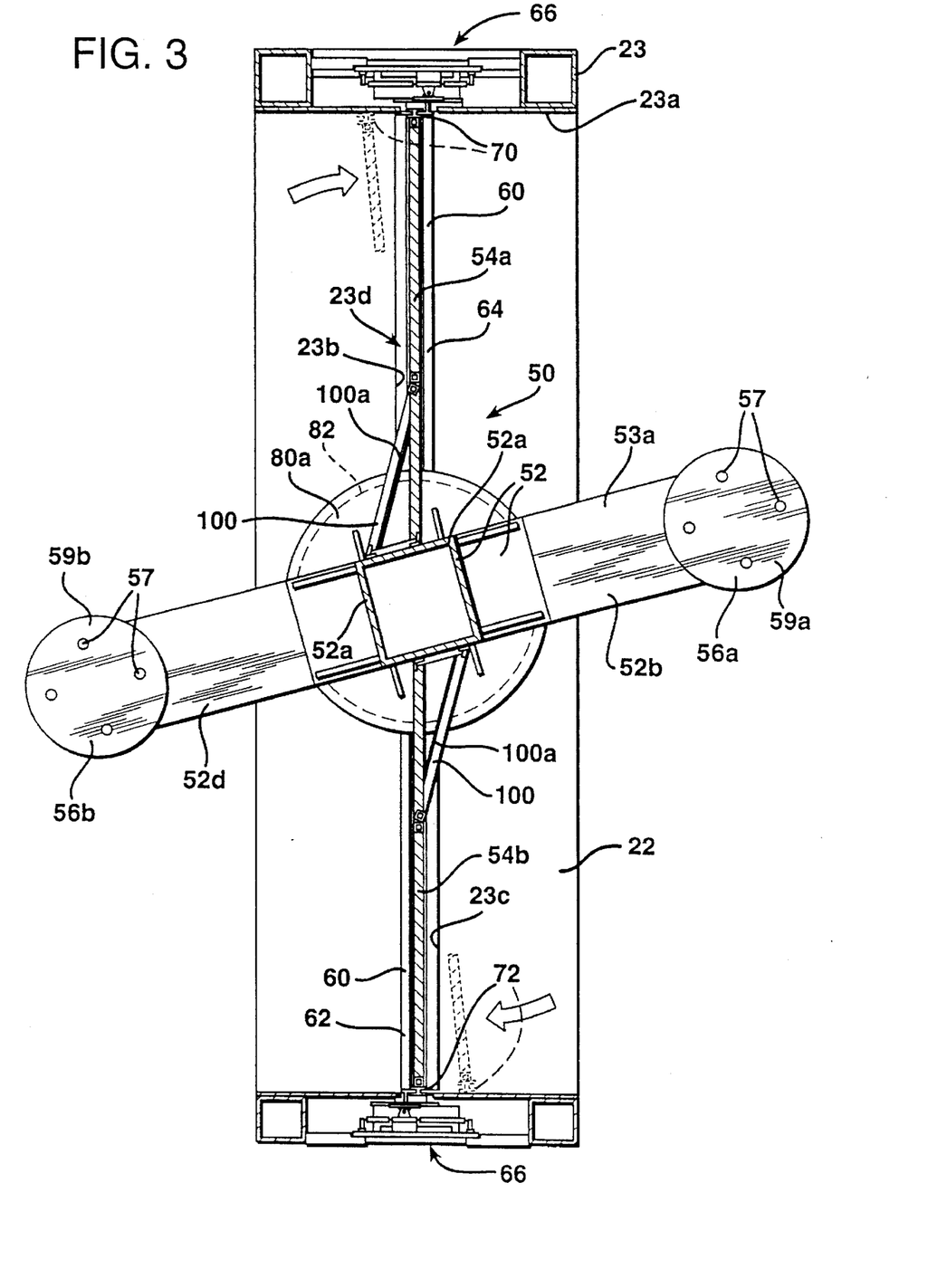
FIG. 3 is a view similar to FIG. 2 showing the workpiece positioner in its second locked position.

The enclosure 10 also includes passive sealing apparatus 60 movably coupled to the casing 23 for sealing edge portions 23b and 23c of the casing 23 with first and second outer edge portions 70 and 72 of the workpiece positioner 50 to inhibit laser energy from exiting the housing 20 through the opening 23a when the workpiece positioner 50 is located in one of its first and second locked positions, see FIGS. 2 and 3.

The passive sealing apparatus 60 comprises first and second sealing members 62 and 64 and horizontal and vertical attachment devices 66 and 68 for movably coupling the first and second sealing members 62 and 64 to the casing 23, see FIGS. 2, 3, 5A and 5B. Each of the first and second sealing members 62 and 64 has a generally "U" shape when viewed in side elevation, and a generally "T" shape when viewed in cross section, see FIGS. 5A, 5B, 7 and 9.

A gap 23d is defined between the edge portions 23b and 23c of the casing 23 and extends about the entire extent of the inner periphery of the casing 23, see FIGS. 1–3. The sealing members 62 and 64 and the attachment devices 66 and 68 are housed within the casing 23, see FIGS. 2 and 3, such that outer and intermediate sections 62a, 62b, 64a and 64b of the first and second sealing members 62 and 64 extend through the gap 23d, see FIGS. 6A, 6B and 7.

Each horizontal attachment device 66 comprises a bearing block 66a which is pivotably connected to one of the first and second sealing members 62 and 64, see FIGS. 6A, 6B, 7 and 8 via mounting structure 66b. The bearing block 66a is movable back and forth along an associated rail 66c which, in turn, is fixedly connected to the casing 23. First and second springs 66d and 66e are interposed between opposing sides of the bearing block 66a and posts 66f. The posts 66f, in turn, are fixedly connected to the casing 23. As will be noted below, the springs 66d and 66e serve to bias the block 66a to an intermediate or "home" position.

Figure 9:
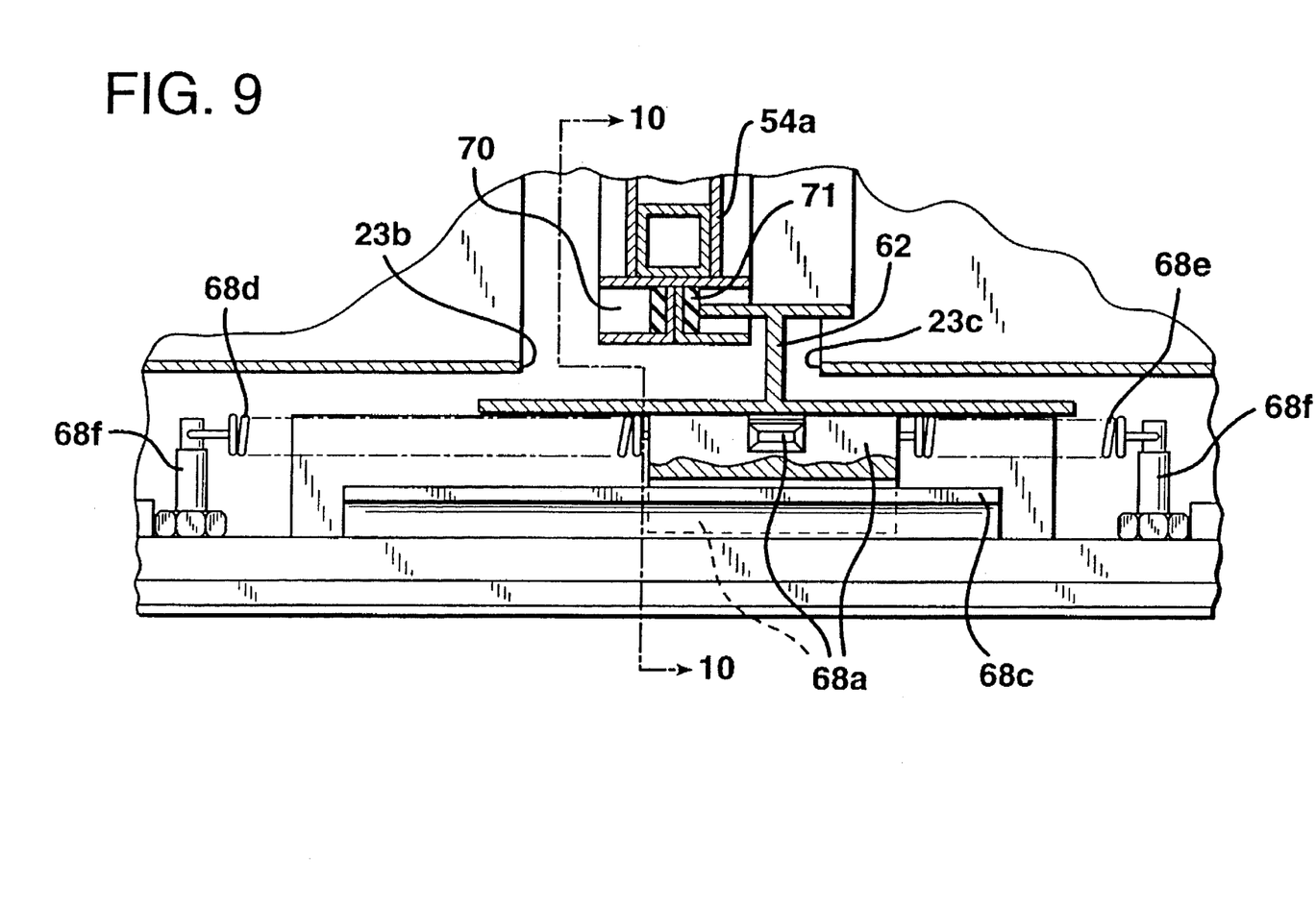
FIG. 9 is a plan view, partially in cross section and partially broken away, of the first sealing member and a vertical attachment device.
Figure 10:
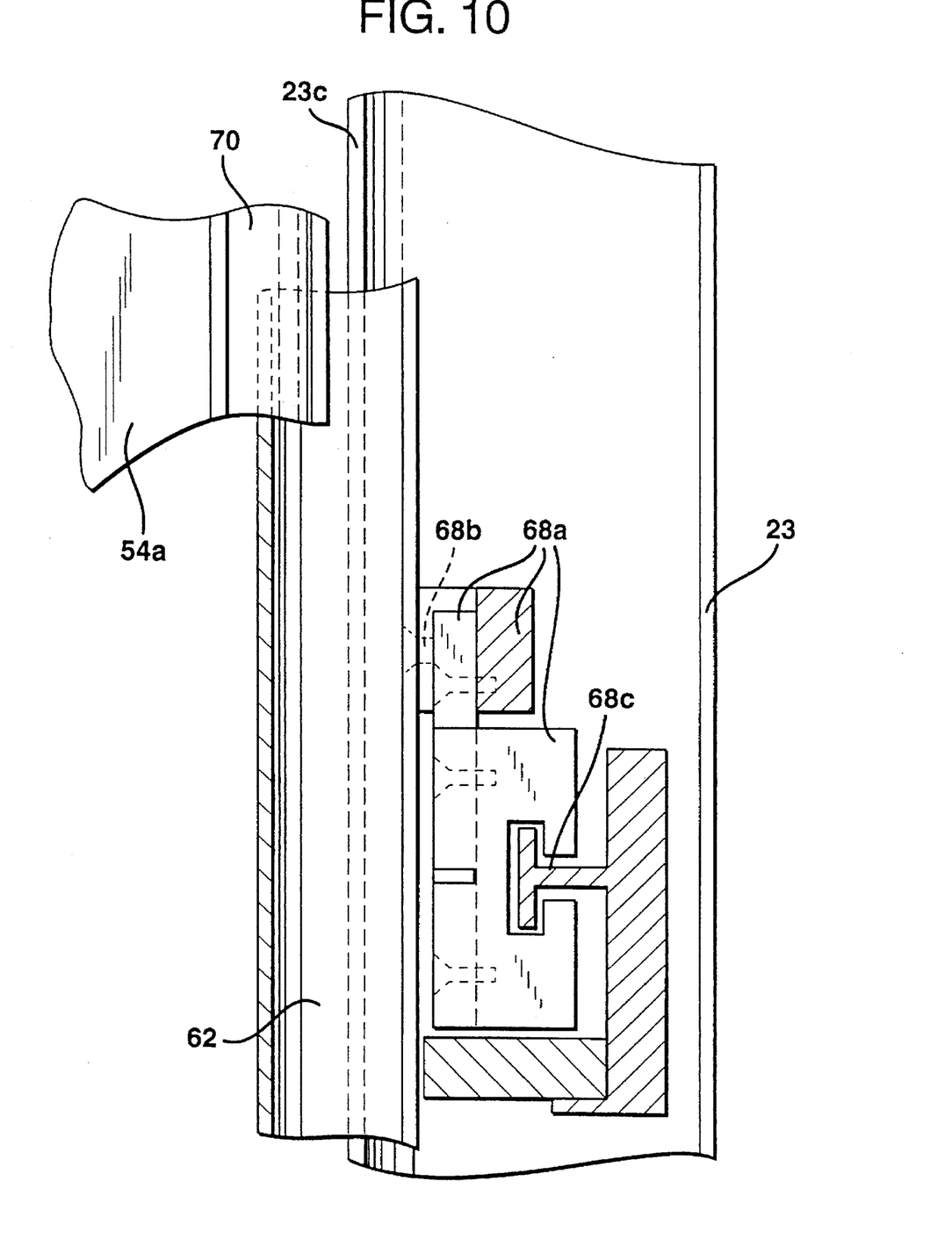
FIG. 10 is a view taken along view line 10—10 in FIG. 9 and with the springs of the attachment device removed.

Each vertical attachment device 68 comprises a bearing block 68a which is fixedly connected to one of the first and second sealing members 62 and 64 via one or more fasteners 68b, see FIGS. 9 and 10. The bearing block 68 is movable back and forth along an associated rail 68c which, in turn, is fixedly connected to the casing 23 at the rail's opposing ends. First and second springs 68d and 68e are connected to opposing sides of the bearing block 68a and posts 68f. The posts 68f, in turn, are fixedly connected to the casing 23. As will be noted below, the springs 68d and 68e serve to bias the block 68a to an intermediate or "home" position.

The first edge portion 70 of the workpiece positioner 50 extends about intermediate and opposing side edge portions of the first shielding panel 54a and the second edge portion 72 extends about intermediate and opposing side edge portions of the second shielding panel 54b, see FIGS. 1, 2 and 3. The first and second edge portions 70 and 72 are generally I-shaped in cross section in the illustrated embodiment.

As the workpiece positioner 50 rotates to either of its first and second locked positions, it engages the first and second sealing members 62 and 64 and causes them to move to a sealed position. Thus, as the workpiece positioner 50 rotates counterclockwise from its second locked position shown in FIG. 3 to its first locked position shown in FIGS. 1 and 2, the first edge portion 70 engages with the outer section 62a of the first sealing member 62 and causes the first sealing member 62 to move to a first sealed position such that intermediate section 62b of the first sealing member 62 is positioned in close proximity to edge 23c, see FIG. 7. Simultaneously, the second edge portion 72 engages with the outer section 64a of the second sealing member 64 and causes the second sealing member 64 to move to a first sealed position such that the intermediate portion 64b is positioned in close proximity to the edge portion 23b, see FIG. 6A. Thus, when the workpiece positioner 50 is in its first locked position, the first edge portion 70, the first sealing member 62 and the edge portion 23c of the casing 23 form a first seal and the second edge portion 72, the second sealing member 64 and the edge portion 23b of the casing 23 for a second seal such that the first and second seals inhibit the escape of laser energy from the inner cavity 20a during a welding or cutting operation.

Figure 6A:
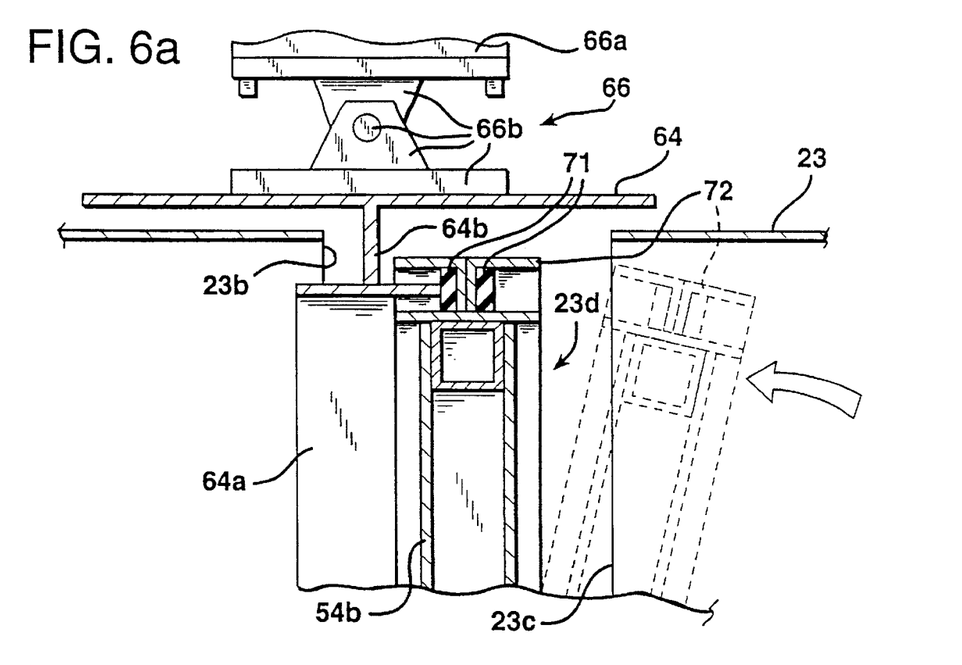
FIG. 6A is a view, partially in cross section, of the second edge portion of the workpiece positioner in engagement with the second sealing member such that the second sealing member is positioned in a first sealed position.
Figure 6B:
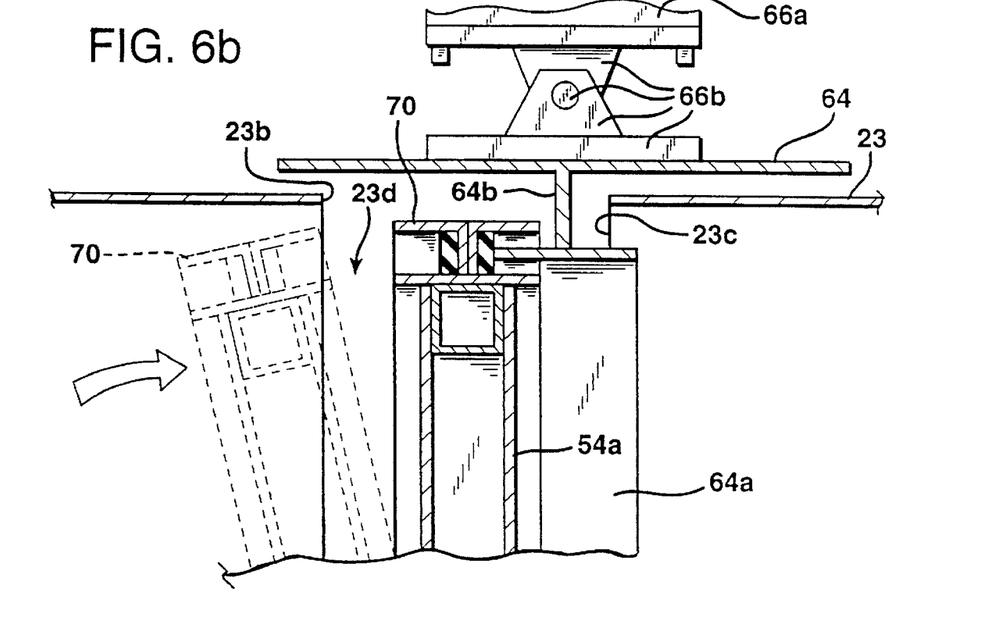
FIG. 6B is a view similar to FIG. 6A showing the first edge portion of the workpiece positioner in engagement with the second sealing member such that the second sealing member is positioned in a second sealed position.
Figure 7:
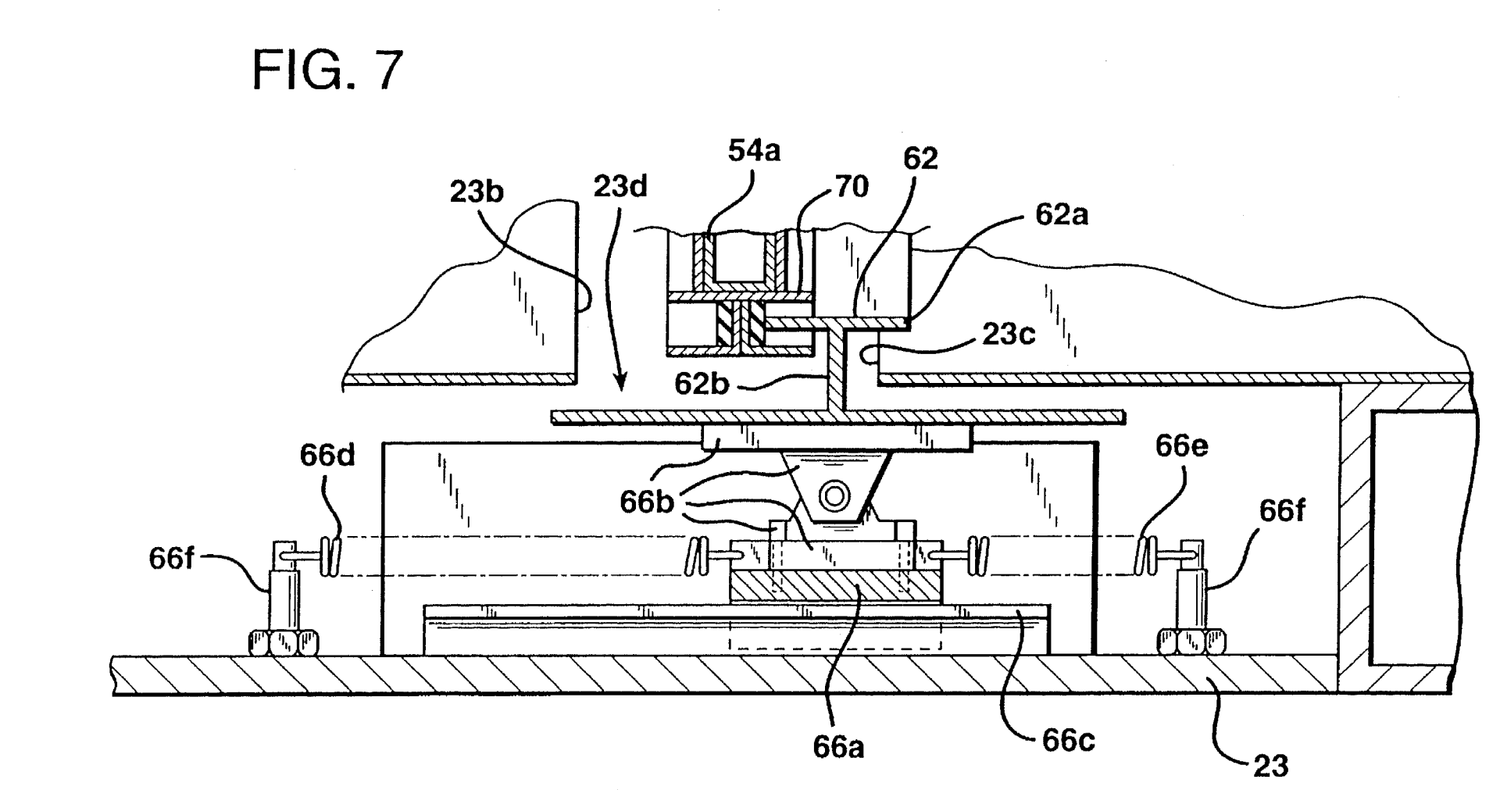
FIG. 7 is a side view, partially in cross section and partially broken away, of the first sealing member and a horizontal attachment device.
Figure 8:
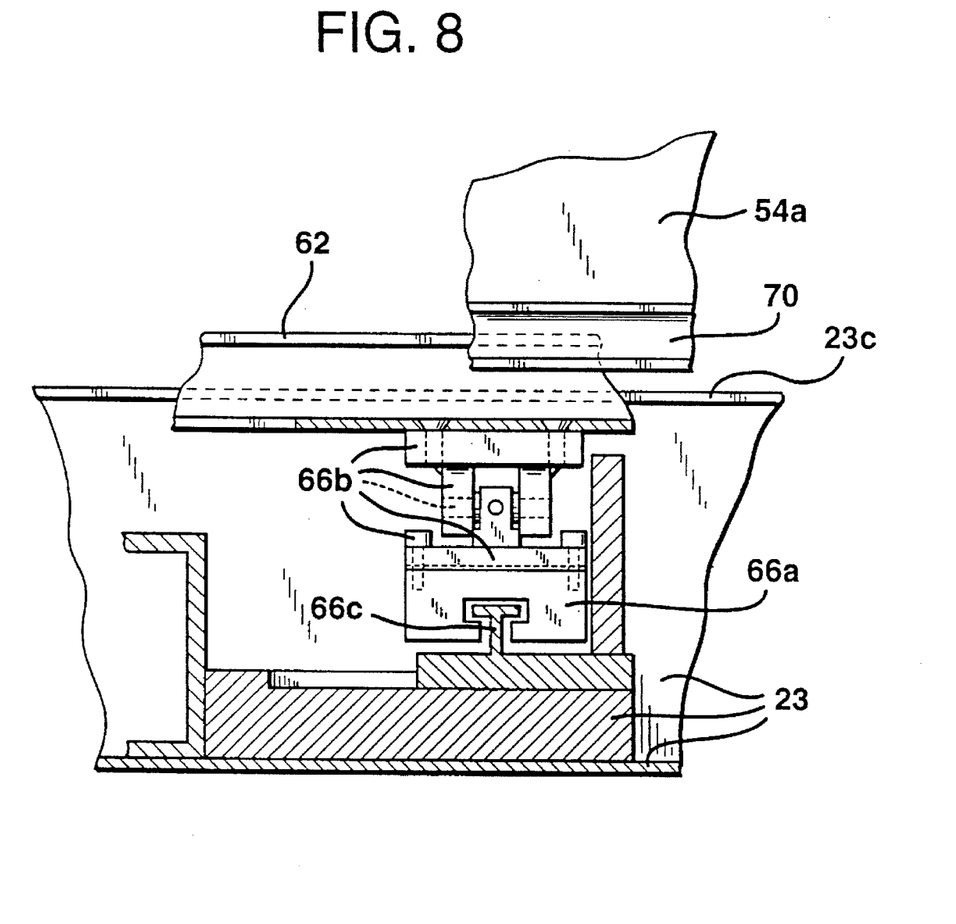
FIG. 8 is a front view, partially in cross section and partially broken away, of the first sealing member and a horizontal attachment device with the springs of the attachment device removed.

When the workpiece positioner 50 rotates clockwise from its first locked position shown in FIGS. 1 and 2 to its second locked position shown in FIG. 3, the first edge portion 70 engages with the outer section 64a of the second sealing member 64 and causes the second sealing member 64 to move to a second sealed position such that the intermediate portion 64b is positioned in close proximity to the edge portion 23c, see FIG. 6B. Simultaneously, the second edge portion 72 engages with the outer section 62a of the first sealing member 62 and causes the first sealing member 62 to move to a second sealed position such that the intermediate portion 62b is positioned in close proximity to the edge portion 23b, see FIG. 3.

As the workpiece positioner 50 moves between its first and second locked positions, the springs 66d and 66e connected to the bearing blocks 66a of the horizontal attachment devices 66 and the springs 68d and 68e connected to the bearing blocks 68a of the vertical attachment devices 68 act to return their respective bearing blocks to their intermediate or "home" positions such that the intermediate portions 62b and 64b of the first and second sealing members 62 and 64 are centrally located within the gap 23d.

The first and second edge portions 70 and 72 are provided with polymeric pads 71 which absorb impact energy resulting from the edge portions 70 and 72 engaging with the first and second sealing panels 62 and 64, see FIGS. 6A and 9.

Figure 4:
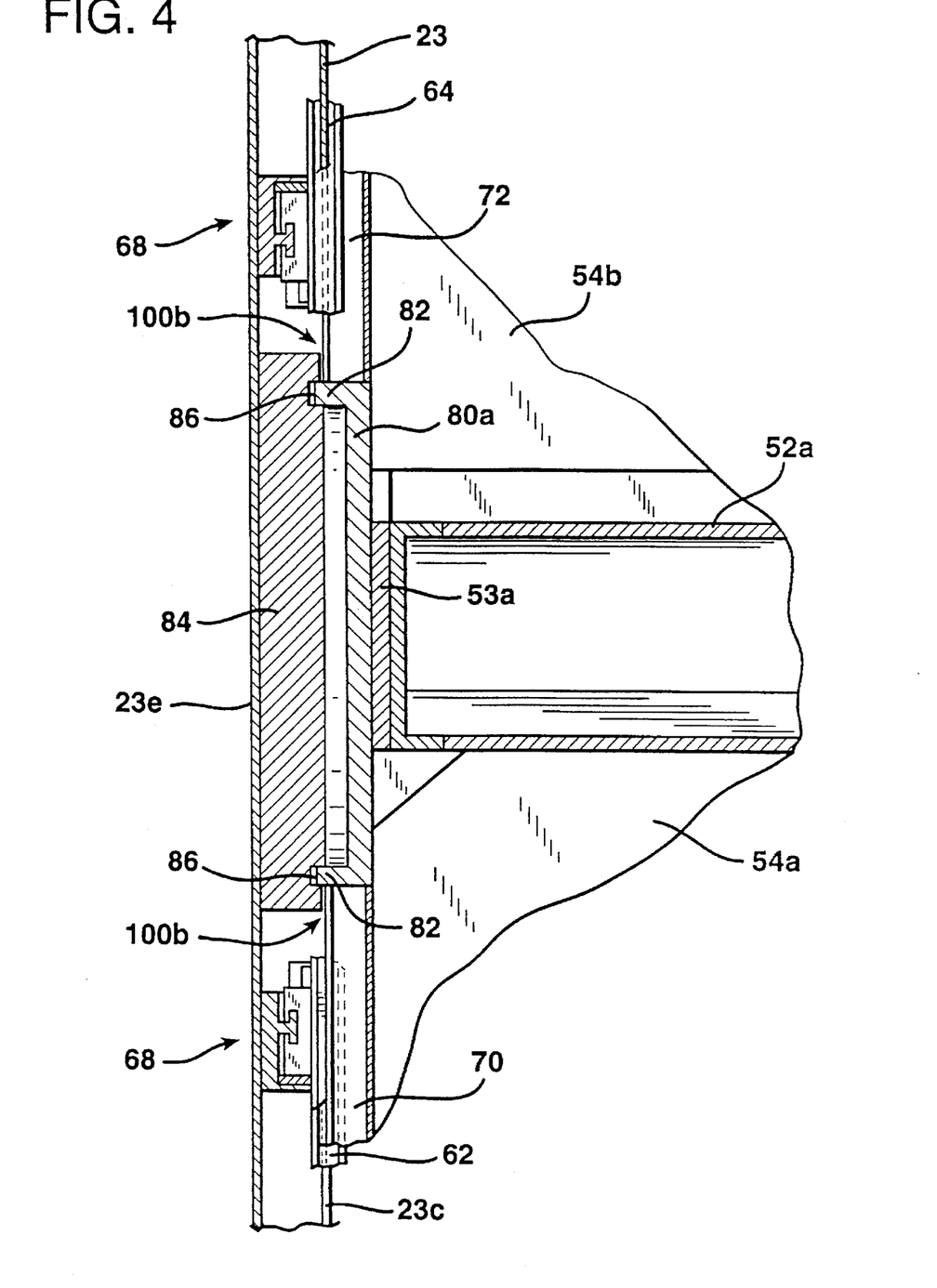
FIG. 4 is a view taken along line 4—4 in FIG. 2.
Figure 5A:
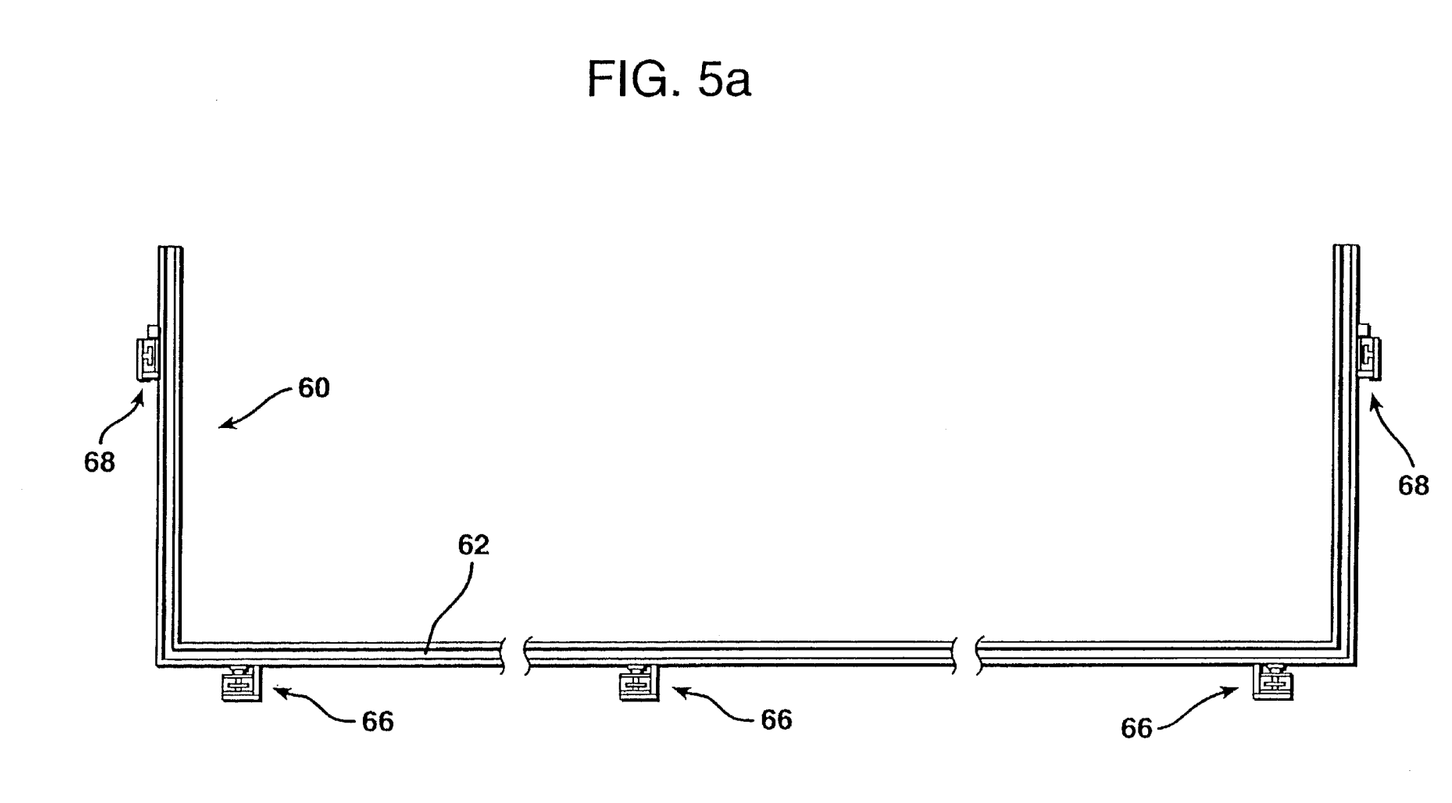
FIG. 5A is a side elevational view of the first sealing member and its associated attachment devices.
Figure 5B:
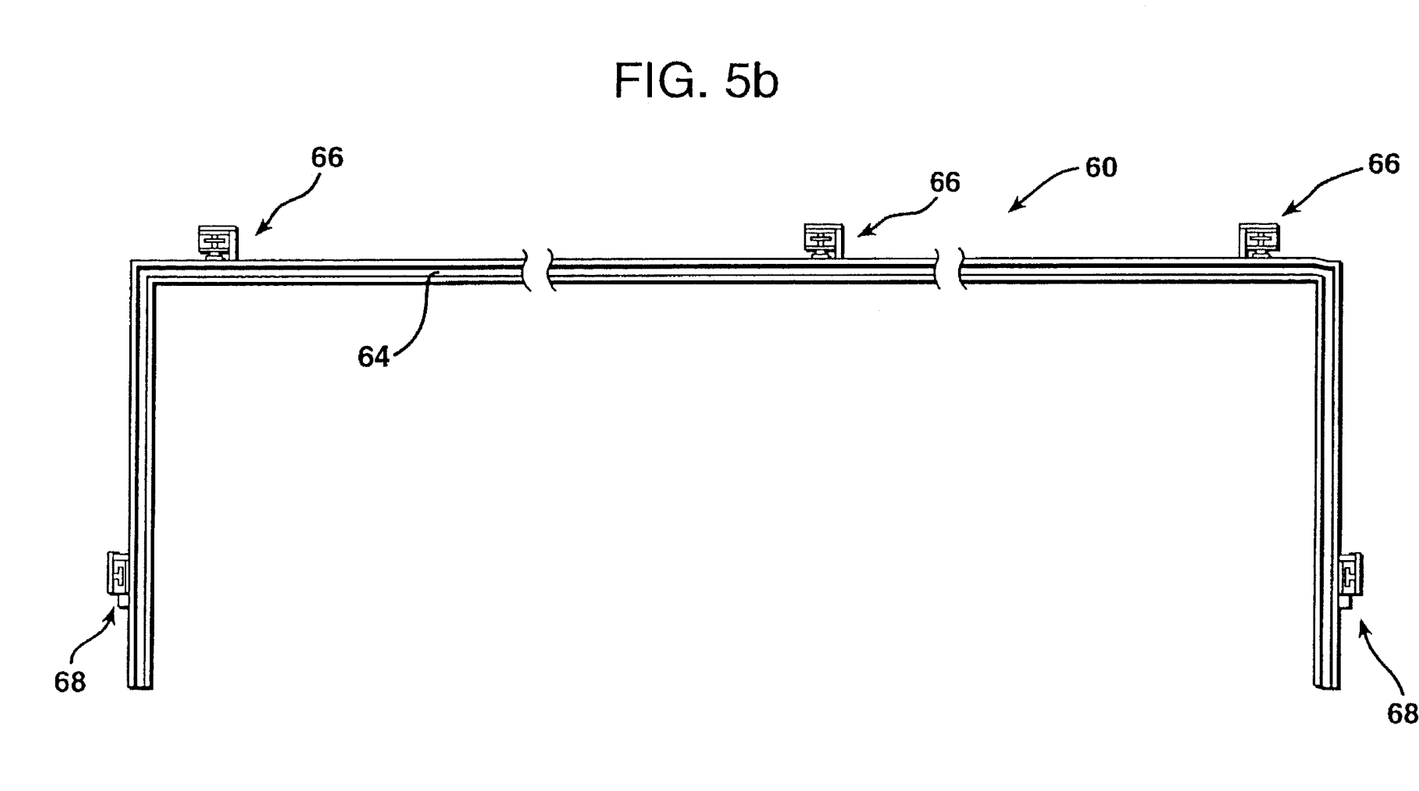
FIG. 5B is a side elevational view of the second sealing member and its associated attachment devices.

The workpiece positioner 50 further includes first and second circular sealing panels 80a and 80b, each having an outwardly extending circumferential sealing portion 82, see FIGS. 1, 1A, 2 and 3. The first circular sealing panel 80a is fixedly connected to the first and second panels 54a and 54b, the first frame arm 53a and the first and second edge portions 70 and 72, see FIGS. 1 and 4. Similarly, the second sealing panel 80b is fixedly connected to the first and second panels 54a and 54b, the second frame arm 53b and the first and second edge portions 70 and 72. The casing 23 includes first and second sealing sections (only first sealing section 84 is shown) fixedly connected to outer side walls 23e and 23f of the casing 23. Each sealing section has a circumferential groove 86 which is adapted to receive the sealing portion 82 of its associated circular sealing panel. As the workpiece positioner 50 rotates between its first and second locked positions, the sealing portions 82 rotate within the circumferential grooves 86 to prevent laser energy generated during a laser operation from leaving the enclosure 10.

Four flexible polymeric sealing flaps 100a are adhesively secured or fastened to four supports 100, see FIGS. 1A, 2 and 3. Two of the supports 100 are positioned adjacent to the first circular sealing panel 80a, see FIGS. 2 and 3, and the remaining two supports 100 are positioned adjacent to the second circular sealing panel 80b, see FIG. 1A. The four supports 100 extend from first frame section 52a to one of the first and second shielding panels 54a and 54b. Each of the four polymeric sealing flaps 100a is configured to extend to and overlap one of the sealing edge portions 23b and 23c and to seal any gaps or clearances such as gaps 100b, see FIG. 4, located between sealing portion 82, first and second edge portions 70 and 72 and the first and second sealing sections.

Conventional position sensors (not shown) are associated with the workpiece positioner 50 to indicate whether it is positioned in its first or second locked position. Signals generated by the position sensors are received by the controller 44 which uses those signals to control the position of the workpiece positioner 50 via the drive device.

It is further contemplated that the first wall 22, the casing 23, the workpiece positioner 50 and the sealing apparatus 60 may be combined to form a stand-alone protective partition (not shown). One or more additional protective walls, arc-screens or weld curtains may be used in combination with the partition.

It is further contemplated that the sealing apparatus may be movably coupled to the workpiece positioner for sealing at least one portion of the casing to at least one portion of the workpiece positioner to inhibit laser energy from exiting the housing through the opening.

Having described the invention in detail and by reference to preferred embodiments thereof, it will be apparent that modifications and variations are possible without departing from the scope of the invention as defined in the appended claims.

What is claimed is:

1. An enclosure comprising:

a housing having an inner cavity in which laser operations are capable of being performed and including a section having an opening through which workpieces pass into and out of said inner cavity;

a workpiece positioner rotatable about a generally horizontal axis for moving said workpieces from a workpiece loading and unloading zone, through said opening to a work zone within said inner cavity, said workpiece positioner including a first workpiece holder adapted to releasably receive at least one of said workpieces; and passive sealing apparatus movably coupled to one of said section and said workpiece positioner for sealing at least one portion of said section to at least one portion of said workpiece positioner to inhibit laser energy from exiting said housing through said opening, said passive sealing apparatus comprising first and second sealing members and slide attachment devices for movably coupling said first and second sealing members to said section.

2. An enclosure as set forth in claim 1, wherein said first section comprises a first generally vertical wall having said first opening therein and said housing further comprises second, third and fourth generally vertical walls, and a ceiling connected to said first, second, third and fourth walls.

3. An enclosure as set forth in claim 1, wherein said workpiece positioner further comprises a frame and first and second shielding panels which are fixedly connected to said frame.

4. An enclosure as set forth in claim 3, wherein said frame comprises a first frame section rotatable about said horizontal axis and second and third frame sections which are spaced from one another and fixedly connected to said first frame section.

5. An enclosure as set forth in claim 4, wherein said first workpiece holder comprises a headstock which is fixedly connected to said second frame section and a tailstock which is fixedly connected to said third frame section.

6. An enclosure as set forth in claim 4, wherein said frame further comprises fourth and fifth frame sections which are spaced from one another and fixedly connected to said first frame section.

7. An enclosure as set forth in claim 6, wherein said workpiece positioner further includes a second workpiece holder comprising a second headstock fixedly connected to said fourth frame section and a tailstock fixedly connected to said fifth frame section.

8. An enclosure as set forth in claim 3, wherein said workpiece positioner further includes a drive device associated with said frame for effecting rotation of said frame through an angle of approximately 180° such that said first workpiece holder moves through an angle of approximately 180° as it moves back and forth between a first loading/unloading position and a first work position.

9. An enclosure as set forth in claim 1, wherein at least one of said slide attachment devices includes a spring-biased bearing block.

10. An enclosure as set forth in claim 1, wherein said workpiece positioner rotates between first and second locked positions and engages with said first and second sealing members as it rotates to either of its first and second locked positions to move said first and second sealing members to a sealed position.

11. An enclosure as set forth in claim 10, wherein a first portion of said workpiece positioner engages with said first sealing member and a second portion of said workpiece positioner engages with said second sealing member when said workpiece positioner is positioned in its first locked position and said first portion of said workpiece positioner engages with said second sealing member and said second portion of said workpiece positioner engages with said first sealing member when said workpiece positioner is positioned in its second locked position.

12. A laser system as set forth in claim 1, wherein at least one of said attachment devices comprises a bearing block which is pivotably connected to one of said first and said sealing members, said bearing block being movable back and forth along an associated rail which in turn is fixedly connected to said first section.

13. A laser system as set forth in claim 1, wherein said at least one portion of said workpiece positioner has a generally I-shaped cross section.

14. A laser system as set forth in claim 1, wherein said first workpiece holder includes a device for effecting rotation of said one workpiece during welding.

15. A partition comprising:
 a section having an opening through which workpieces pass into and out of a work zone;
 a workpiece positioner for moving said workpieces from a workpiece loading and unloading zone, through said opening to said work zone, said workpiece positioner including a workpiece holder adapted to releasably receive at least one of said workpieces; and
 passive sealing apparatus comprising at least one sealing member which is movably coupled to one of said section and said workpiece positioner via at least one slide attachment device for sealing at least one portion of said section to at least one portion of said workpiece positioner to inhibit laser energy from exiting through said partition opening.

16. An enclosure as set forth in claim 15, wherein said first section comprises a first generally vertical wall having said first opening therein.

17. An enclosure as set forth in claim 15, wherein said workpiece positioner further comprises a frame and first and second shielding panels which are fixedly connected to said frame.

18. An enclosure as set forth in claim 17, wherein said frame comprises a first frame section rotatable about a horizontal axis and second and third frame sections which are spaced from one another and fixedly connected to said first frame section.

19. An enclosure as set forth in claim 15, wherein said first workpiece holder comprises a headstock which is fixedly connected to said second frame section and a tailstock which is fixedly connected to said third frame section.

20. An enclosure as set forth in claim 15, wherein said slide attachment device comprises a bearing block which is pivotably connected to said one sealing member, said bearing block being movable back and forth along an associated rail which in turn is fixedly connected to said first section.

21. An enclosure as set forth in claim 20, wherein said workpiece positioner rotates between first and second locked positions and engages with said at least one sealing member as it rotates to either of its first and second locked positions to move said at least one sealing member to a sealed position.

22. An enclosure as set forth in claim 15, wherein said workpiece holder includes a device for effecting rotation of said one workpiece during welding.

23. An enclosure as set forth in claim 15, wherein said slide attachment device includes a spring-biased bearing block.

24. An enclosure comprising:
 a housing having an inner cavity in which laser operations are capable of being performed and including a section having an opening through which workpieces pass into and out of said inner cavity;
 a workpiece positioner for moving said workpieces from a workpiece loading and unloading zone, through said opening to a work zone within said inner cavity, said workpiece positioner including a workpiece holder adapted to releasably receive at least one workpiece; and
 passive sealing apparatus comprising at least one sealing member which is movably coupled to one of said section and said workpiece positioner via at least one slide attachment device for sealing at least one portion of said section to at least one portion of said workpiece positioner to inhibit laser energy from exiting said housing through said opening, said slide attachment device including a spring-biased bearing block.

25. An enclosure as set forth in claim 24 wherein said workpiece holder includes a device for effecting rotation of said one workpiece.

26. A partition comprising:
 a section having an opening through which workpieces pass into and out of a work zone;
 a workpiece positioner for moving said workpieces from a workpiece loading and unloading zone, through said opening to said work zone, said workpiece positioner including a workpiece holder adapted to releasably receive at least one of said workpieces; and
 passive sealing apparatus comprising at least one sealing member which is movably coupled to one of said section and said workpiece positioner via at least one slide attachment device for sealing at least one portion of said section to at least one portion of said workpiece positioner to inhibit laser energy from exiting through said partition opening, said at least one slide attachment device comprises a bearing block which is movable back and forth along an associated rail.

* * * * *